No. 883,244. PATENTED MAR. 31, 1908.
H. SHRADER.
ROW MARKER FOR PLANTERS.
APPLICATION FILED SEPT. 23, 1907.
3 SHEETS—SHEET 1.
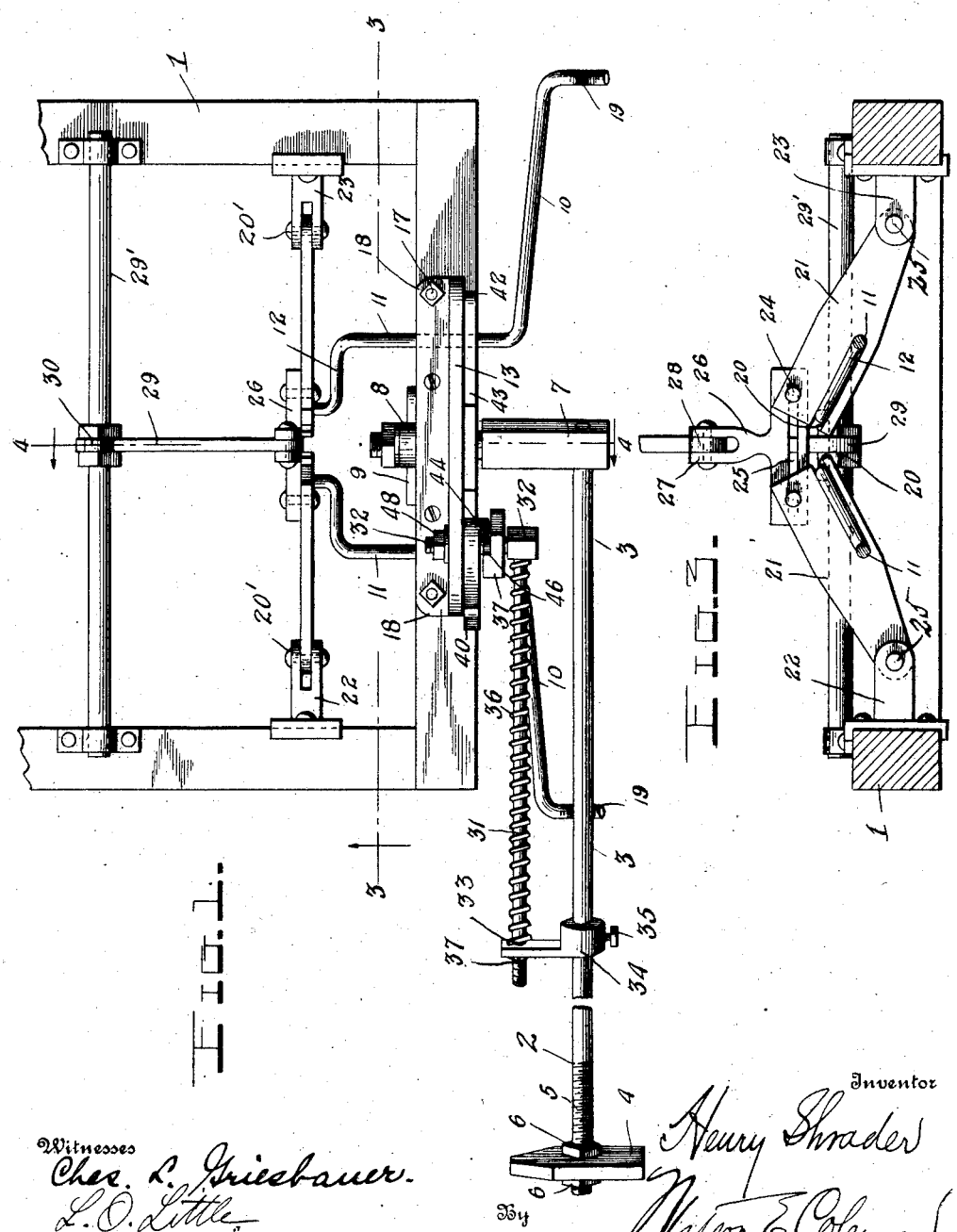
Witnesses
Chas. L. Griesbauer.
L. O. Little.
Inventor
Henry Shrader
By Watson E. Coleman
Attorney No. 883,244. PATENTED MAR. 31, 1908.
H. SHRADER.
ROW MARKER FOR PLANTERS.
APPLICATION FILED SEPT. 23, 1907.
3 SHEETS—SHEET 2.
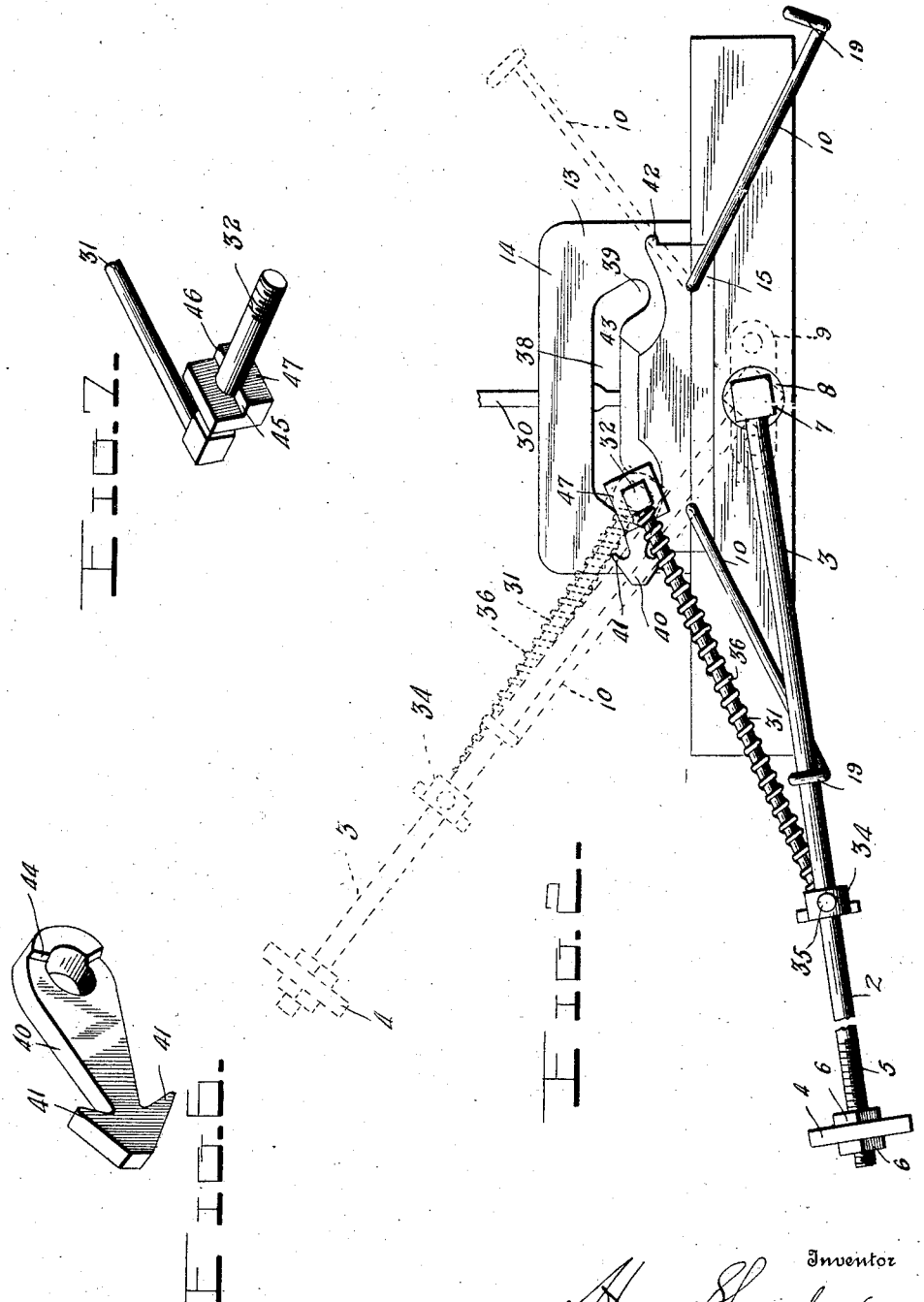

No. 883,244. PATENTED MAR. 31, 1908.
H. SHRADER.
ROW MARKER FOR PLANTERS.
APPLICATION FILED SEPT. 23, 1907.
3 SHEETS—SHEET 3.
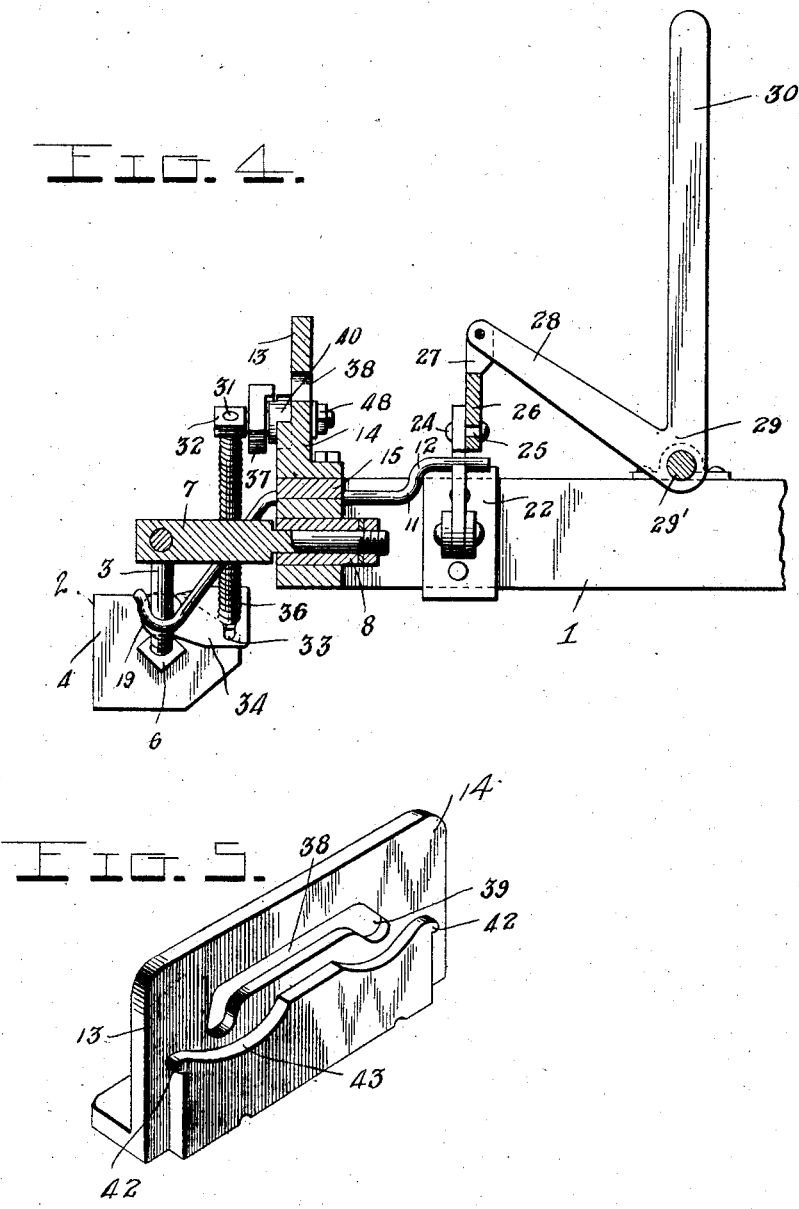
Witnesses
Chas. L. Griesbauer.
L. O. Little.
Inventor
Henry Shrader
By Watson E. Coleman
Attorney

UNITED STATES PATENT OFFICE.

HENRY SHRADER, OF DIXON, ILLINOIS.

ROW-MARKER FOR PLANTERS.

No. 883,244.      Specification of Letters Patent.      Patented March 31, 1908.

Application filed September 23, 1907. Serial No. 394,175.

*To all whom it may concern:*

Be it known that I, HENRY SHRADER, a citizen of the United States, residing at Dixon, in the county of Lee and State of Illinois, have invented certain new and useful Improvements in Row - Markers for Planters, of which the following is a specification, reference being had to the accompanying drawings.

My invention relates to improvements in row markers or gages for use on corn planters and similar agricultural implements, and it consists of the novel construction and the combination and arrangement of parts hereinafter described and claimed.

The object of the invention is to provide a simple and practical device of this character which may be readily applied to a corn planter or the like and by means of which the marker arm may be easily and conveniently thrown from one side of the implement to the other when the latter is turned at the ends of the field.

A further object of the invention is to provide an improved means whereby the marker arm will be held down in contact with the ground so as to produce a plainly visible mark or line.

The above and other objects of the invention, which will appear as the nature of the invention is better understood, are attained in the preferred embodiment of the invention illustrated in the accompanying drawings in which—

Figure 1 is a top plan view of a portion of the frame of a corn planter showing the application of the invention thereto; Fig. 2 is a rear end elevation of the same showing the parts in their normal lowered position in full lines and in a partially raised position in dotted lines; Fig. 3 is a vertical transverse section taken on the plane indicated by the line 3—3 in Fig. 1; Fig. 4 is a vertical longitudinal section taken on the plane indicated by the line 4—4 in Fig. 1; Fig. 5 is a detail perspective of the guide plate; Fig. 6 is a similar view of the locking dog; and Fig. 7 is a similar view of the shoulder collar upon the pivot of the tension rod.

In the drawings 1 denotes a portion of the frame of a corn planter or similar agricultural implement upon which my improved row marker 2 is mounted. The invention comprises a swinging marker or gage arm 3 having upon its outer end a marking device 4 preferably in the form of a runner as shown. This runner has its forward end tapered so that either of its longitudinal edges may readily run over the ground and make a mark or line therein. While this runner may be fixed to the frame in any suitable manner I preferably make it adjustable thereon by screw threading a portion of the outer end of the arm as shown at 5 and forming the runner with a threaded aperture to receive the threads upon the arm. If desired clamping nuts 6 may be arranged upon the threads 5 on opposite sides of the runner for clamping the latter in an adjusted position. The inner end of the arm 3 carries a right angularly disposed pivot 7 mounted for rotation in a suitable bearing sleeve 8 arranged in the center of the rear cross beam of the frame 1 as more clearly shown in Fig. 4. Said pivot is preferably removably mounted by constructing it as shown in said Fig. 4 and providing a washer and nut upon its threaded forward end. The bearing sleeve 8 is secured in the opening in said cross bar of the frame by forming its forward end with oppositely projecting apertured ears 9 to receive screws or similar fastenings as indicated in dotted lines in Fig. 2.

The marker arm 3 is thrown from one side to the other of the machine or implement by means of two crank arms 10 arranged upon the rear ends of double crank shafts 11 having cranks 12 upon their front ends. The shafts 11 extend longitudinally of the frame and are mounted for rotation in bearings in a combined guide and bearing member 13 arranged upon said rear cross bar of the frame 1. The member 13 consists of an upper or main section 14 and a lower plate 15. These parts may be suitably secured together by screws or bolts and in their opposing faces are formed the bearing openings for the shafts 11. The member 13 may be set into the rear cross bar of the frame 1 or upon the top of said bar and is rigidly secured to the same by bolts or similar fastenings 17 passed through apertured attaching feet 18. The outer ends of the rear crank arms 10 are formed with rearwardly and upwardly curved hook-shaped portions 19 adapted to receive the arm 3 as shown. By constructing said cranks with the ends 19 it will be seen that they will tend to hold said arm at right angles to the line of travel of the machine and remove a portion of the strain from the pivot 7 of said marker arm. The front crank arms 12 project through slots 20 formed in the inner ends of two transversely disposed links or levers 21 which have their outer ends pivoted at 25 between spaced bearing ears on brackets 22, 23 secured to the side bars of the frame 1 as more clearly shown in Fig. 3. The inner ends of the links 21 carry pins or studs 24 which project through and slide in a longitudinal slot 25 formed in a connecting plate or yoke 26 from the top of which projects a bifurcated arm 27. In the latter is pivoted one arm 28 of a bell crank lever 29 mounted upon a transverse shaft or rod 29' upon the frame 1 and having its other arm 30 projecting upwardly to form an operating handle. It will be seen that when the handle 30 is swung rearwardly the slotted yoke or plate 26 will be forced downwardly and that the latter will carry the slotted links 21 with it and therefore actuate the double crank shafts 11. When the cranks 12 are depressed the cranks 10 will be elevated and one of the latter will swing the marker arm 3 upwardly and over into the hook or end 19 of the other crank 10.

For the purpose of assisting the above described mechanism in moving the crank arm over the center of its pivot 7 and for the purpose of yieldably pressing the runner or shoe 4 of the marker arm into the ground so as to make a clearly visible line, I preferably provide a spring tension device consisting of a rod or arm 31 provided at its inner end with a shiftable pivot 32 and having its other end projecting loosely through the slot 33 formed in a bracket 34 which is adjustably mounted upon the marker arm 3. Said bracket 34 is apertured to receive and slide upon the arm 3 and is adjustably secured thereon by a set screw 35 or in any other suitable manner. A coil spring 36 surrounds the tension rod 31 and is confined between its pivot 32 and the bracket 34. The outer end of the rod 31 is retained in the slot 33 in the bracket 34 by one or more nuts 37 which latter may be adjusted for the additional purpose of regulating the tension of the spring. The pivot 32 of the tension rod projects at right angles from the same and is arranged for sliding and rotary movement in a longitudinal slot 38 formed in the upright portion of the member or plate 13 and having at its ends depressions or seats 39. These seats are disposed on opposite sides on the vertical plane of the pivot 7 of the marker arm so that when said arm is raised while the pivot 32 of the tension rod is engaged with one of said seats, the spring 36 will be compressed by the inward movement of the bracket 34 on the rod 31, due to the eccentric disposition of the two pivots 32, 7, until said bracket 34 passes the center of the pivot 32 whereupon the spring 36 will exert its energy and tend to force the marker arm over its vertical pivot 7 and down upon the other side of the machine, as will be readily understood upon reference to the dotted line position of said parts in Fig. 2 of the drawings. In this way the spring or tension device assists the cranks 10 in throwing the marker arm from one side to the other of the machine and dispenses with the necessity of a very extensive range of movement of said cranks 10.

In order to retain the pivot 32 in one or the other of the seats 39 so that the spring 36 will exert its energy at all times and tend to force the marker arm downwardly toward the ground, I provide a double locking dog 40. This dog is loosely mounted for swinging movement upon the pivot 32 and is disposed preferably upon the rear side of the plate or member 13. Its outer end is formed with oppositely projecting hooks 41 which are adapted to alternately engage the stop shoulders or projections 42 formed upon the plate or member 13 adjacent to its opposite ends. These shoulders or projections 42 are preferably arranged at the ends of a curved or cam shaped ledge 43 formed upon the plate or member 13 as shown and adapted to assist in guiding the dog 40 as the pivot 32 moves through the slot 38 from one to the other of the seats 39. Said dog 40 is swung from one of its sides to the other as the pivot 32 is rotated by providing upon its inner end a lateral projection or shoulder 44 adapted to be alternately engaged by the ends 45, 46 of a similar lateral projection formed upon a collar 47 which may be fixed to or formed integral with the pivot 32. Owing to the shape and arrangement of the shoulders 44, 45, 46 it will be seen that the pivot 32 and the collar 47 upon it may have a limited swinging movement before the engagement of one of the shoulders 45 or 46 with the shoulder 44 on the dog, hence the latter will not be disengaged from one of the projections or shoulders 42 until the marker arm has been elevated to an extent sufficient to bring the tension arm almost into the vertical plane of the pivot 32. Owing to this construction it will be seen that when the marker arm is thrown from one side to the other of the machine the pivot 32 of the tension device will be retained in one of the seats 39 until the marker arm has passed the center of its pivot 7, and that said pivot 32 will not be shifted from one of the seats 39 to the other until the marker arm has passed its pivot and is swinging downwardly upon the other side of the machine to its normal lowered position. The pivot 32 is preferably removably mounted in the slot 38 by providing upon its forward threaded end a washer and a nut 48.

In operation when it is desired to move the marker arm from one side to the other of the machine the lever 30 is swung rearwardly to depress the links 21 and swing the crank shafts 11. As the crank 10 upon one of said shafts elevates the marker arm the bracket 34 on the latter elevates the tension rod 31 and compresses the spring 36; and as the pivot 32 of said rod rotates one of the shoulders 45, 46 on its collar will engage the shoulder 44 on the dog and swing said dog 40 to release it from one of the shoulders or projections 42. When the dog is thus released and the rod 31 passes the center of the pivot 32 the spring 36 will tend to assume its normal position or expand and force the marker arm over its pivot 7 and then downwardly into the hook 19 of the other crank 10 as above set forth. The continued rotation of the pivot 32 causes the dog to swing over upon its other side so that when said pivot enters the seat 39 at the opposite end of the slot 38 said dog will drop into engagement with the other shoulder or projection 42 and lock the tension device and hence the marker arm in their reversed position as will be readily understood.

While I have shown and described the preferred embodiment of the invention it will be understood that I do not wish to be limited to the precise construction herein set forth and that various changes in the form, proportion and minor details may be resorted to without departing from the spirit or sacrificing any of the advantages of the invention.

It will also be understood that while the invention is here shown as in the form of an attachment for ready application to a corn planter it may, with slight modifications, be built into the machine or implement when it is manufactured so as to form a permanent part of the same.

Having thus described my invention what I claim is:

1. In a row marker, a swinging marker arm, means for turning the same from one side to the other of the machine and a tension device connected to the arm and having a single actuating spring whereby it will force the arm downwardly upon either side of the machine.

2. In a row marker, a swinging marker arm, means for turning the same from one side to the other of the machine and a tension device connected to the arm and having a shiftable fulcrum and a single actuating spring, whereby it will both assist said actuating means in moving the marker arm over the vertical center of its pivot and force the arm downwardly upon either side of the machine.

3. In a row marker, a swinging marker arm, means for turning the same from one side to the other of the machine and a spring device connected to the arm and having a shiftable fulcrum upon the machine, whereby it will assist the arm over the vertical center of its pivot and also force it downwardly upon either side of the machine.

4. In a row marker, a swinging marker arm, means for turning the same from one side to the other of the machine, a guide and bearing member, a tension rod connected to the arm and having a shiftable pivot mounted in said member, and a spring to co-act with said rod and arm.

5. In a row marker, a swinging marker arm, means for turning said arm from one side to the other of the machine, a guide member having a slot provided with seats, a tension rod having a pivot to work in said slot and engage said seats, an element upon said arm to slidably receive said rod and a coil spring arranged upon the rod and bearing against said element, substantially as set forth.

6. In a row marker, a swinging marker arm, means for turning said arm from one side to the other of the machine, a guide member having a slot provided with seats, a tension rod having a pivot to work in said slot and engage said seats, an element upon said arm to slidably receive said rod, a coil spring arranged upon the rod and bearing against said element and means for retaining the pivot of said rod in one of said seats until the marker arm passes its pivot.

7. In a row marker, a swinging marker arm, means for turning said arm from one side to the other of the machine, a guide member having a slot provided with seats, a tension rod having a pivot to work in said slot and engage said seats, an element upon said arm to slidably receive said rod, a coil spring arranged upon the rod and bearing against said element, locking shoulders or projections and a double dog mounted upon the pivot of said rod and adapted to alternately engage said locking shoulders or projections to retain the pivot of said rod in said seats, substantially as set forth.

8. In a row marker, a swinging marker arm, means for turning said arm from one side to the other of the machine, a guide member having a slot provided with seats, a tension rod having a pivot to work in said slot and engage said seats, an element upon said arm to slidably receive said rod, a coil spring arranged upon the rod and bearing against said element, locking shoulders or projections, a double dog to co-act with the latter and loosely mounted upon the pivot of said rod, said dog being formed with a shoulder or projection, and shoulders or projections upon the pivot of said rod to co-act with the one upon the dog, substantially as set forth.

9. In a row marker, a swinging marker arm, means for turning the same from one side to the other of the machine, a guide and bearing member, a tension rod having a shiftable pivot mounted in said guide and bearing member, a bracket adjustable upon the marker arm and adapted to slidably receive said rod, and a coil spring arranged upon the rod between its pivot and said bracket, substantially as set forth.

10. In a row marker, a swinging marker arm, means for turning the same from one side to the other of the machine, a tension device connected to the arm and having a shiftable fulcrum and means for preventing the shifting of said fulcrum until the marker arm passes the vertical center of its pivot.

11. In a row marker, a swinging marker arm, means for turning the same from one side to the other of the machine, a tension device connected to the arm and having a shiftable fulcrum, locking shoulders and a double locking dog carried by said shiftable fulcrum and adapted to engage said locking shoulders.

12. In a row marker, a frame, a swinging marker arm thereon, a pair of longitudinal shafts having crank arms at both their front and rear ends, one shaft being upon each side of the pivot of the marker arm, the crank arms at the rear ends of said shafts being adapted to engage and actuate the marker arm, opposing links pivoted at their outer ends to the frame and having their inner ends slotted to receive the crank arms at the front ends of said shafts, a yoke loosely connecting said links and an operating lever connected to said yoke.

13. In a row marker, a frame, a swinging marker arm thereon, a pair of longitudinal shafts having crank arms at both their front and rear ends, one shaft being upon each side of the pivot of the marker arm, the crank arms at the rear ends of said shafts being adapted to engage and actuate the marker arm, brackets upon the opposite sides of the frame, links pivoted at their outer ends in said brackets and having their opposing inner ends slotted to receive the crank arms on the front ends of said shafts, studs carried by the inner ends of said links, a yoke slotted to receive said studs and adapted to loosely connect said links and a bell crank having one arm connected to said yoke.

In testimony whereof I hereunto affix my signature in the presence of two witnesses.

HENRY SHRADER.

Witnesses:
J. W. WEYANT,
JNO. H. EWEN.